June 12, 1962  P. MOLLARD  3,038,842
PROCESS OF MAKING SODIUM PERBORATE BY ELECTROLYSIS
Filed Jan. 5, 1959
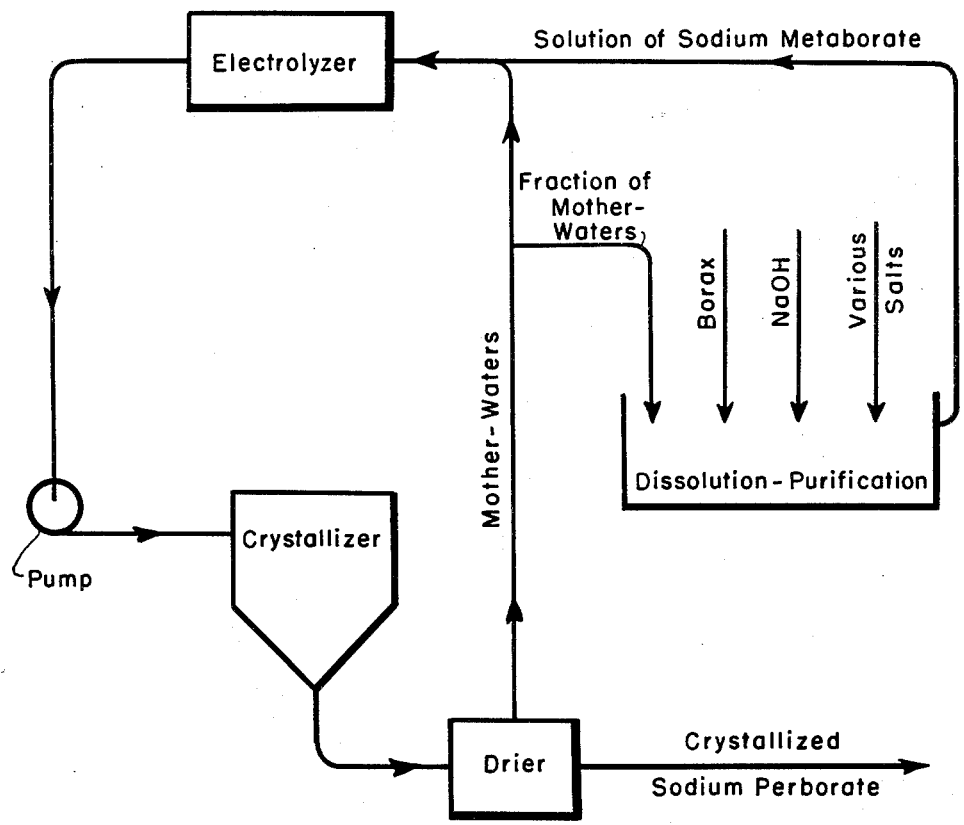
INVENTOR.
Paul Mollard
BY
HIS ATTORNEYS

# United States Patent Office 3,038,842
Patented June 12, 1962

3,038,842
PROCESS OF MAKING SODIUM PERBORATE BY ELECTROLYSIS
Paul Mollard, Sainte-Foy-Les-Lyon, France, assignor to Societe d'Electro-Chimie d'Electro-Metallurgie et des Acieries Electrique d'Ugine, Paris, France, a corporation of France
Filed Jan. 5, 1959, Ser. No. 785,066
Claims priority, application France Jan. 7, 1958
1 Claim. (Cl. 204—85)

The present invention relates to an improvement in the process of making sodium perborate by electrolysis.

According to a known process, a solution is electrolyzed, said solution containing essentially sodium carbonate and bicarbonate and borax, together with various salts. The borax is added in the solid state to the electrolyzer where it is maintained in suspension by a violent stirring. In the course of one cycle, which is often of 12 hours' duration, borax is transformed into perborate which is found either dissolved or in the form of crystals in suspension. The concentrations of sodium carbonate and bicarbonate vary during the course of the operation, a part of the carbonate being transformed into bicarbonate. The reaction may be represented as follows:

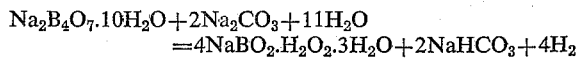

When, at the end of the cycle, the borax has been completely converted into perborate, the electrolyzer is partially emptied and the liquid taken out is treated to extract the perborate therefrom by precipitation. The mother-waters separated from the precipitate are treated with sodium hydroxide to neutralize the bicarbonate according to the reaction:

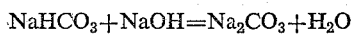

and to restore in the solution the initial ratio of carbonate to bicarbonate. The solution is then purified and returned to the electrolyzer.

The borax is afterwards added in the solid form to the electrolyzer for a new operation.

This known process presents many disadvantages:

(1) The necessary addition of sodium hydroxide and various salts to the mother-waters, before putting them again in the cycle of the operations, necessitates a purifying of these mother-waters owing to the impurities brought by the raw materials. This purifying is expensive; it is normally made at a temperature of 80° C.; and generally it is carried out daily with 80% of the electrolyte volume and entails the destruction of 3% of the active oxygen produced, thereby resulting in a substantial loss of yield of perborate.

(2) The electrolysis conditions are not constant and the carbonate to bicarbonate ratio lessens from the beginning to the end of the operation, which has an unfavorable effect on the yield.

(3) The borax addition to the electrolyzer being made in the solid form, the impurities contained in the borax are introduced into the electrolyzer, said impurities, manganese, iron and copper salts, constituting the main cause of pollution of the electrolyte.

Now, applicant, utilizing the great solubility of metaborate in comparison with borax, has found that it was possible, by introducing boron into the circuit in the form of metaborate, to eliminate the impurities of the employed raw materials (borax, sodium hydroxide and various salts) by treating only a much smaller part of the mother-waters than in the other electrolytic processes known.

Applicant's work on the relative solubility of the various salts present, under the conditions of operation, has shown it was possible to dissolve all the necessary borax in a part only of the circulating mother-waters, without having to add an amount of water greater than that which is used up by the electroylsis and the crystallization of perborate, thus enabling the water balance to be maintained.

The direct feeding of metaborate in the crystallized form has already been proposed. Now the use of crystals presents two disadvantages:

(1) The price of the pure crystallized metaborate is such that it practically annuls the advantages of the continuous feeding.

(2) It is not possible to purify the already circulating mother-waters because the sodium hydroxide which would be necessary for this purifying pre-exists in the crystallized metaborate. In metaborate, as a matter of fact, the $Na_2O/B_2O_3$ mol ratio is 1:1, as in perborate, whereas in borax this ratio is 1:2, thus requiring an addition of $Na_2O$, i.e., sodium hydroxide, to pass from the borax form to the metaborate or perborate form.

The present invention enables all of the above difficulties to be overcome. It concerns improvements in the process of making sodium perborate by electrolysis of a solution of borax and sodium carbonate and bicarbonate and various salts, which consists in introducing in a continuous manner, into the circuit, the boron element in the form of sodium metaborate, which is more soluble than borax, by using for dissolving of the metaborate, a minor part only of the mother-waters after crystallization of the sodium perborate which have been taken off from circuit, this metaborate being prepared by the addition of sodium hydroxide and borax outside the electrolyzer.

This metaborate solution is first subjected to a purifying in order to eliminate the impurities introduced by the sodium hydroxide, borax and various salts and then brought in a continuous manner directly or indirectly into the electrolyzer. The electrolyte charged with perborate coming out of the electrolyzer is sent to a crystallization system where perborate separates, whereas the mother-waters return to the electrolyzer after addition of the metaborate solution prepared in the manner hereinabove described.

The circulation speed of the liquid is so regulated that the active oxygen content of the electrolyte drawn off from the electrolyzer is greater by 0.1 to 0.4 g./l. and preferably by 0.1 to 0.2 g./l. than that of the introduced mother-waters. The carbonate to bicarbonate ratio is maintained constant in the circuit due to the continuous addition of the boron element in the form of sodium metaborate in which, as recalled above, the $Na_2O/B_2O_3$ ratio is 1:1 as in the sodium perborate and in amount corresponding to that which has been precipitated in the perborate form in the crystallizer.

Thus:

(a) Boron in the form of sodium metaborate solution is introduced in a continuous manner into the electrolyzer.

(b) This solution is prepared starting from a fraction of the mother-waters.

(c) The raw materials borax, sodium hydroxide and various salts are introduced into this solution which is afterwards purified before entering the electrolyzer, said sodium hydroxide and said borax forming sodium metaborate.

(d) A constant carbonate to bicarbonate ratio is maintained in the electrolyte.

The operation circuit of the invention can be according to the attached flowsheet.

By utilizing this process, the loss of active oxygen, resulting from the purifying operations, is reduced proportionally to the volume of the treated mother-waters and the yield of perborate is increased.

The advantages of adopting and the conditions of carrying out these various steps are explained hereinafter:

(1) It was usual, according to prior known practice, to introduce borax into the electrolyzer in the solid form. This borax formed a very thin pulp whose crystals dissolved as they were transformed into perborate. The dissolution was then made under the form of metaborate by reaction of the dissolved carbonate on the borax according to the reaction:

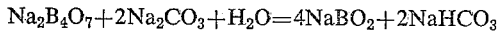

$$Na_2B_4O_7 + 2Na_2CO_3 + H_2O = 4NaBO_2 + 2NaHCO_3$$

Now applicant has found it advantageous to form the metaborate solution outside the electrolyzer by addition of sodium hydroxide (NaOH) and borax, either anhydrous or hydrous. The raw materials for the reaction can thus be brought into the electrolyzer in the form of a solution sufficiently charged with boron at room temperature but without risk of supersaturation or precipitation. Such a solution is described further in paragraph 3 hereunder.

(2) In the known process, borax is the main source of the electrolyte pollution. The addition of borax in the solid form directly to the electrolyzer pollutes as a matter of fact the whole of the electrolyte. It is then necessary to purify almost all the crystallization mother-waters. The introduction of the borax in the form of a metaborate solution enables it, on the contrary, to be purified before introducing it into the electrolyzer. It is therefore possible, as also indicated in paragraph 3 hereunder, to ensure this dissolution in a reduced volume of liquid.

(3) In the process according to the invention, the pure solution of metaborate is made from mother-waters of crystallization of the perborate, to which anhydrous or hydrated borax, soda and various salts are added. Only a small part of these mother-waters is used, generally 10 to 20% of the volume in circulation, not including the volume of the apparatus for stocking and purifying the solution. The use of a part only of the mother-waters prevents the solution from becoming progressively enriched in impurities, and, as already said hereabove, limits the amount of the active oxygen loss due to the purification of a great volume of mother-waters. This loss can be reduced to less than 1% instead of 3%.

The purification of this solution, i.e., the removal of the impurities brought in by the raw materials (borax, sodium hydroxide and various salts), such as salts of manganese, iron, copper, etc., is carried out, for example, by heating the solution to 80° C. in the presence of some adjuvants facilitating the flocculation of the metal hydrates. After a rest of several hours, the still warm solution is filtered and stocked.

(4) The purified solution is brought in a continuous manner into the electrolyzer. It contains an amount of water smaller than that which is used up by the electrolysis and crystallization.

(5) In the known process, in which the borax and sodium hydroxide are introduced discontinuously, the carbonate to bicarbonate ratio in the electrolyte decreases in the course of the electrolysis. Now, on account of an increasing insufficiency of the amount of carbonate and the detrimental part played by the bicarbonate on the stability, the yield decreases. In the process of the invention, on the contrary, this ratio is maintained constant at its optimum value.

(6) In the known process, after partial emptying of the electrolyzer, the volume of removed liquid is replaced by mother-waters which have been alkalinized so as to neutralize the excess bicarbonate. In view of the greater solubility of perborate in alkaline medium, this addition is attended by a temporary increase of the perborate content which can last one hour and whose effect on the yield is unfavorable. Moreover, at the end of the cycle of 12 hours, the borax addition is substantially reduced in order to ensure its complete dissolving and to avoid removing from the electrolyzer crystals of borax mixed with perborate. Now the lessening of the borax concentration in the electrolyte lowers the yield. Both disadvantages are avoided by a continuous feeding of boron in the form of a solution of sodium metaborate.

(7) In the process of the invention, it is possible to separate the steps of formation and precipitation of perborate because the solution coming out of the electrolyzer can be introduced into an independent crystallizer, operating continuously, from which the crystallized perborate is removed and the mother-waters returned to the electrolyzer. This mode of operation presents the advantage of a continuity which allows:

A continuous feeding of boron in the form of metaborate solution to the electrolyzer, and A faster circulation of the electrolyte in the electrolyzer, favorable to the obtaining of high yields.

The process according to the invention enables finally the obtaining of the following advantages:

(1) Simplified operation of the electrolyzer.
(2) Better mode of introduction of the raw materials into the circuit.
(3) Systematic purifying of all the raw materials before their introduction into the circuit.
(4) Reduction of the volume of the solutions to be purified.
(5) Possibility of carrying out the crystallization outside the electrolyzer and of profiting by a yield increase.

The following non-limitative examples further illustrate the invention.

*Example 1*

In this example, the known method was employed, which consisted in introducing the boron element into the electrolyzer in the form of crystallized borax. After a certain number of hours of working, a fraction of the electrolyte was taken out, from which the crystallized perborate in suspension was extracted by drying. The mother-waters were afterwards alkalinized, then reintroduced into the electrolyzer.

The electrolyzer, of a total volume of 2,000 l. and of a useful capacity of 1,700 l., contained two blocks of electrolyzers of 4,000 amperes each. The anodes were formed by a grid obtained by weaving platinum threads of 0.15 mm. diameter. The cathodes, composed of steel sheets, were separated from the anodes by a distance of about 3 mm. The average terminal voltage of the cell was 6.1 volts. The bath temperature was maintained at 10.5° C. by circulation of pickling brine inside a coil of piping located in the tank.

A stirrer maintained the precipitated perborate in suspension and ensured the dissolving of the introduced borax crystals. The circulation of the mother-waters between the anodes and cathodes was ensured only by the oxygen and hydrogen emission.

This tank working under 8,000 A. contained at the outset a liquid whose $Na_2CO_3$ content was 130 g./l., the $NaHCO_3$ content was 30 g./l. and the $Na_2CO_3$ to $NaHCO_3$ ratio amounted thus to 4.33. It received a charge of solid borax of 95 kgs. for 12 hours of running. After this period, the electrolyte composition had varied; the carbonate content had decreased about 30 g./l. whereas the bicarbonate content had increased about 24 g./l. and the $Na_2CO_3$ to $NaHCO_3$ ratio amounted to 1.85.

40% of the tank volume was then drawn off to extract therefrom the manufactured perborate. After extraction, the mother-waters were neutralized with soda so as to compensate for the sodium used up by the transformation of borax into perborate. The mother-waters were afterwards purified as above indicated, then charged again into the electrolyzer in an amount to bring the electrolyte in the electrolyzer up to the 1,700 liter level, the electrolyte thus formed having the same contents of $Na_2CO_3$ and $NaHCO_3$ as the initial electrolyte.

By using borax of standard quality, the perborate production per 12 hours was 151 kgs. for a borax consumption of 93.5 kgs., whence a Faraday efficiency of about 55%. The energy consumption amounted to 3.85 continuous kwh. per kg. of perborate produced.

Example 2

In this example, all conditions were the same as in the preceding example except that the known feeding with solid borax was replaced by the continuous feeding in the form of a solution of pure sodium metaborate according to the invention.

This sodium metaborate solution was prepared by dissolving borax and sodium hydroxide (NaOH) in sufficient amounts to form the sodium metaborate, in a fraction corresponding to 20% of the volume of the crystallization mother-waters. It was afterwards carefully purified and introduced in a continuous manner into the electrolyzer, in an amount corresponding to the perborate formation.

The electrolyte composition did not vary since the sodium corresponding to the perborate crystallization was compensated by that which was brought in by the metaborate solution prepared as hereinbefore described. After 12 hours, 40% of the tank volume was removed, as in Example 1: after extraction of the perborate, the mother-waters were returned to the cell, except for the fraction taken off to prepare a new solution of metaborate. Under these conditions, the perborate production per 12 hours was 172 kgs. for a consumption of 107 kgs. of borax, whence a Faraday efficiency of 60%. The energy consumption amounted to 3.5 continuous kwh. per kgs. of perborate produced.

Example 3

In an installation of a smaller capacity, the electrolytic preparation of perborate was carried out in a really continuous running and by causing perborate crystallization outside the electrolyzer. This electrolyzer, of the forced circulation type, was fed by the mother-waters which came out of the crystallizer, after cooling down to about 10° C. These mother-waters containing no perborate crystals were charged again with active oxygen as they passed through the electrolyzer before going anew into the crystallizer.

According to the invention, a portion of the mother-waters was taken off every day, each daily portion amounting to 35.5 liters. Each portion had 29.6 kgs. of crystallized borax and 6.2 kgs. of caustic soda reckoned as NaOH added to it which reacted to form sodium metaborate and each portion was diluted to 68 liters by water addition. After purifying, this solution was introduced in a continuous manner into the return circuit of the mother-waters to the electrolyzer, at a temperature of about 30° C., in an amount corresponding to the perborate formation.

The electrolyte composition, in addition to the aforesaid metaborate, contained:

| | G./l. |
|---|---|
| $Na_2CO_3$ | 126 |
| $NaHCO_3$ | 26 |
| Borax ($Na_2B_4O_7.10H_2O$) | 16 |
| $Na_2Cr_2O_7$ | 0.4 |
| $MgSiO_3$ | 0.1 |

The sodium bichromate and magnesium silicate are well-known adjuvants added to the bath which is used for the manufacture of sodium perborate by electrolysis. The sodium bichromate is a cathodic reducing agent, whereas the magnesium silicate is a stabilizing agent.

Its active oxygen content was 0.5 g./l. at the entrance of the electrolyzer and 0.6 g./l. at the outlet of the electrolyzer. Its outflow from the electrolyzer was 2 m.³/h. The electrolyzer worked under 1,000 A. The anode was composed of 5 platinum grids formed by threads of 0.13 mm. diameter, interwoven in chain formation. The 5 grids, of dimensions 250 x 280 mm., were inserted between six steel cathodes of the same size. The anode-cathode distance was 2.75 mm., the volume of circulating liquid, not including that of the stocking and purifying apparatuses, was 280 l., the anodic density was 0.8 A. per cm.², the electrolyte temperature was 10.5° C. and the electrolyzer terminal voltage was 5.15 volts. The forced circulation through the electrolyzer lowered the concentration of the gases in the liquid and quickened the depolarization of the electrodes, which lowered the running voltage to 5.15 volts instead of 6.1.

As in Example 2, the electrolyte composition did not vary since the sodium corresponding to the perborate formation was compensated by that which was contained in the metaborate solution. Thus, 1,946 g. of crystallized sodium perborate were produced per hour, for a borax consumption of 1,205 g., whence a Faraday efficiency of 69.5%. The energy consumption amounted to 2.6 continuous kwh. per kg. of perborate.

Example 4

Independent electrolyzers and crystallizers have been built which were intended to ensure the continuous electrolytic making of perborate under a load of 8,000 A. with a terminal voltage of 5.2 volts, i.e., at the scale of a known apparatus adapted for discontinuous running. The mother-waters circuit was identical to that of Example 3. The continuous feeding with pure metaborate was also used, according to the invention, since this electrolyzer type with forced circulation requires a very great purity of the raw materials in order to profit by the high efficiency of the apparatus.

15.8 kgs. of crystallized sodium perborate were produced per hour for a borax consumption of 9.8 kgs., this corresponding to a Faraday efficiency of 69%. The energy consumption amounted to 2.6 continuous kwh. per kg. of perborate.

By using the same apparatus, but without using the process according to the invention, we would have obtained, under the same conditions, only a yield of 60 to 62%.

In short:

(a) The feeding of the metaborate has enabled the loss of active oxygen to be lowered from 3% to 1%.

(b) The Faraday efficiency has been raised: from 55% to 60% by introduction of the boron in the form of a sodium metaborate solution and by keeping constant the ratio of $Na_2CO_3$ to $NaHCO_3$; and to 69% by the perborate continuous crystallization outside the electrolyzer.

(c) It has been possible to lower the energy consumption from 3.85 to 2.6 continuous kwh. per kilo of perborate produced.

The invention is not limited to the preferred embodiment but may be otherwise embodied or practiced within the scope of the following claim.

I claim:

The continuous process of making sodium perborate, which comprises electrolyzing in an electrolysis cell an aqueous solution of borax, sodium carbonate, sodium metaborate and sodium bicarbonate to form sodium perborate in the solution, continuously removing the solution containing sodium perborate from the cell and crystallizing sodium perborate from its mother-waters, then dissolving borax and sodium hydroxide containing salts of magnesium, iron and copper as impurities, in a minor portion only of said mother-waters, thereby forming sodium metaborate solution, heating the solution to precipitate the impurities contained in said borax, in said sodium hydroxide, and in said minor portion of said mother-waters, eliminating the impurities and continuously introducing into the cell the remainder of said mother-waters and the purified sodium metaborate solution, the latter in such amount as to correspond substantially to the amount of sodium perborate crystallized from its mother-waters so that the carbonate to bicarbonate ratio is maintained substantially constant in the electrolysis cell.

References Cited in the file of this patent

UNITED STATES PATENTS

| | | |
|---|---|---|
| 1,235,905 | Liebknecht | Aug. 7, 1917 |
| 1,268,369 | Liebknecht | June 4, 1918 |
| 1,395,685 | Liebknecht | Nov. 1, 1921 |
| 1,408,364 | Langhard | Feb. 28, 1922 |

OTHER REFERENCES

Transactions of the Electrochemical Society, vol. XL (1921), pages 139–156.